(12) United States Patent
Alexander

(10) Patent No.: US 6,613,165 B1
(45) Date of Patent: Sep. 2, 2003

(54) PROCESS FOR HEAT TREATING BULLETS COMPRISING TWO OR MORE METALS OR ALLOYS

(76) Inventor: Kenneth L. Alexander, 576 Crestline Circle Dr., Lewiston, ID (US) 83501

( * ) Notice: Subject to any disclaimer, the term of this patent is extended or adjusted under 35 U.S.C. 154(b) by 0 days.

(21) Appl. No.: 10/091,707

(22) Filed: Mar. 5, 2002

Related U.S. Application Data
(60) Provisional application No. 60/118,290, filed on Feb. 2, 1999.

(51) Int. Cl.⁷ .............................. C21D 9/16; C21D 8/10
(52) U.S. Cl. ...................... 148/536; 148/518; 148/516; 148/527; 102/516
(58) Field of Search ................................ 148/536, 518, 148/516, 527; 102/516

(56) References Cited

U.S. PATENT DOCUMENTS

| | | |
|---|---|---|
| 1,318,860 A | 10/1919 | Fries et al. |
| 1,865,727 A | 7/1932 | Schuricht et al. |
| 3,599,573 A | 8/1971 | Sliney |
| 4,004,042 A | 1/1977 | Fairbairn |
| 4,044,679 A | 8/1977 | Pagano et al. |
| 4,108,073 A | 8/1978 | Davis |
| 4,129,061 A | 12/1978 | Bedall et al. |
| 4,387,492 A | 6/1983 | Inman |
| 4,644,867 A | 2/1987 | Hellner et al. |
| 4,746,360 A | 5/1988 | Calboreanu |
| 4,750,427 A | 6/1988 | Carter |
| 4,753,688 A | 6/1988 | Myers |
| 4,793,037 A | 12/1988 | Carter |
| 4,879,953 A | 11/1989 | Carter |
| 4,935,200 A | 6/1990 | LaSalle et al. |
| 5,048,162 A | 9/1991 | Nelson |
| 5,069,138 A | 12/1991 | Ekbom |
| 5,069,869 A | 12/1991 | Nicolas et al. |
| 5,105,514 A | 4/1992 | Bilsbury et al. |
| 5,185,495 A | 2/1993 | Petrovich et al. |
| 5,187,325 A | 2/1993 | Garvison |
| 5,361,768 A | 11/1994 | Webler et al. |
| 5,464,487 A | 11/1995 | Bane |
| 5,535,495 A | 7/1996 | Gutowski |
| 5,567,908 A | 10/1996 | McCubbin et al. |
| 5,621,186 A | 4/1997 | Carter |
| 5,641,937 A | 6/1997 | Carter |

OTHER PUBLICATIONS

Marshall, D., *Stronger Bullets with Less Alloying in Cast Bullets*, Col. EH Harrison (ed.) NRA, Washington, D.C., 1979, No. 211, pp. 118–129.

Vaughn, H., *Rifle Accuracy Facts*, Precision Shooting, 1998, pp. 156–157.

Marshall, D., *Cast Bullet Heat Treatment* in RCBS Cast Bullet Manual, 1986, pp. 29–33.

*Primary Examiner*—Deborah Yee
(74) *Attorney, Agent, or Firm*—Klarquist Sparkman LLP

(57) ABSTRACT

Embodiments of the described method include (a) forming a core comprising a lead alloy, (b) applying copper or a copper alloy to at least a portion of an exterior surface of the core to form a jacketed bullet, (c) heating the jacketed bullet at a pre-selected temperature for a period of time sufficient to simultaneously harden the core and stress-relieve the copper jacket, and, optionally, (d) reworking a selected portion of the heat-treated bullet by mechanical reforming or annealing to lower the hardness of the reworked portion.

16 Claims, 6 Drawing Sheets

PROCESS FOR HEAT TREATING BULLETS COMPRISING TWO OR MORE METALS OR ALLOYS

CROSS REFERENCE TO RELATED APPLICATIONS

This application claims priority from U.S. patent application Ser. No. 09/369,666, filed Aug. 5, 1999, now U.S. Pat. No. 6,352,600, which claims the benefit of U.S. Provisional Patent Application No. 60/118,290, filed on Feb. 2, 1999. These related applications are incorporated herein by reference.

FIELD

Described below are (1) a method for heat treating parts comprising multiple dissimilar metals and/or alloys to simultaneously soften some metals and/or alloys and harden others, and (2) parts made by the method. More particularly, specific implementations concern heat treating a bullet having a core and a jacket on at least a portion of an external surface of the core, wherein the heat treatment simultaneously hardens the core and softens the jacket.

BACKGROUND

A typical cartridge includes a casing and a bullet. The casing is a generally cylindrical container that houses gun powder and incorporates a primer on one end and an opening on the other end. A bullet is fitted into the open end. A firing pin strikes and detonates the primer to ignite the gun powder, which produces a large gas pressure that forces the bullet outwardly and away from the casing, down and out of the firearm's barrel.

Bullets are known that have an inner core and an outer jacket on at least some portion of the core's outer surface. The inner core usually is made from a high-density, high-ductility, low-cost material, such as lead. The outer jacket is made of a harder material, such as copper or copper alloys. Bullets having this structure are referred to herein as ball ammunition bullets.

Bullets are jacketed for several reasons. First, lead and most lead alloys have yield strengths of 10,000 psi or less. Pressures produced within the casing exceed these yield strengths, and can be at least as high as 50,000 psi. Such high pressures can deform non-jacketed lead bullets and thereby deleteriously affect the projectile's performance. Second, the temperature of the burning gun powder can be greater than the melting point of lead and lead alloys used to make bullet cores. That portion of a core exposed to a temperature greater than its melting point can melt, and can be deposited on the wall of the barrel. Over time, such deposits can alter the flight of subsequently fired bullets. Bullet jackets can protect the core from damaging temperatures. Third, when the bullet is fired down the barrel, rifling (inner-facing helical grooves within the barrel) forces the bullet to spin. This spin stabilizes and increases the accuracy of a bullet. Lead and lead alloys can be stripped off the unprotected surface of the lead bullet by the rifling. Stripping deposits material in the barrel, which can result in inadequate bullet rotation and, consequently, decreased accuracy. Jackets protect the lead alloy core from rifling damage.

Jackets also increase bullet rigidity and can increase the ability of a bullet to penetrate a given target. A bullet's penetrating capability predominantly is a function of its impact velocity, the shape of the bullet, and the hardness, strength, and resistance to deformation of a bullet's component parts. Because both the hardness of the jacket and the core affect the ability of a bullet to penetrate a target, penetrator ammunition bullets have a steel core tip with the remainder of the core being a lead alloy. However, these additional parts included in penetrator ammunition bullets typically decrease their accuracy.

A major factor in a bullet's trajectory and retained velocity at any given point is the bullet's ballistic coefficient. The ballistic coefficient is a measure of the bullet's ability to resist atmospheric frictional drag, and primarily is a function of a bullet's form and density. A bullet having a greater density will have a better ballistic coefficient, a greater retained velocity at a given point, and a flatter trajectory than bullets that are less dense. Armor-piercing ammunition bullets and penetrator ammunition bullets typically replace at least part of the lead core with steel, which is less dense than lead or lead alloys, and therefore have poorer ballistic coefficients than otherwise equivalent ball ammunition bullets. Thus, although armor-piercing and penetrator ammunition bullets have greater penetration performance, their in-flight performance is poor when compared to denser ball ammunition bullets.

Knowing the effects of core hardness on a bullet's penetrating capability, methods are known by which bullets are heat treated without applying a jacket to the core. Precipitation hardening is one heat-treating process that has been used to harden bullets made from lead alloys. Precipitation-hardening has four steps: first, the metal is heated to a sufficient temperature; second, the metal is held at this temperature for a period of time (commonly referred to as "soak time"); third, the metal is quenched in a liquid; and fourth, the metal is aged, which refers to the period subsequent to quenching and prior to any further mechanical or heat processing, and during which the physical property in question is changing, e.g., during which period the hardness of the bullet increases. The metal may initially be softer than it was originally after the heating and quenching process, but the hardness soon increases as the metal ages. For a description of precipitation-hardening and a discussion of possible explanations for the resulting increase in hardness, see William Howard Clapp and Donald Sherman Clark, *Engineering Materials and Processes* 183–84 (1954).

The hardness of a bullet typically is measured by a Brinell Hardness Number (BHN). This value is useful because it is directly proportional to the yield strength of the metal tested. A BHN value for an article is obtained using a test device. The test device includes a spring-loaded plunger that screws into a loading press and applies a known load on a ball bearing, which then creates a small crater in the object being measured. If the dimensions of all components in the test device are known, the BHN is determined by the equation:

$$BHN = 0.0004485 * F / \{(\pi/2) * D^2 * [1 - \sqrt{1 - (d/D)^2}]\}$$

where

F = load, pounds

D = ball diameter, inches d = diameter of crater in sample, inches $\pi = 3.14159$ BHN values of lead cores produced by conventional bullet processing methods are typically reported in units of kg/mm² (such values also can be stated simply as Brinell Hardness Numbers, e.g., BHN values of 8 kg/mm² are reported as 8 or 8 Brinell). From the BHN, the core yield strength of the measured object is then determined by multiplying the BHN by about 515. For a review of how to construct a test device to measure the Brinell Hardness Number and core yield strength, see Harold R. Vaughn's *Rifle Accuracy Facts*, Precision Shooting, Inc. Press, Manchester, Conn., (1998).

Prior heat-treated bullets typically have been mechanically worked after the core heat treatment to resize and shape the bullet and apply the jacket to the core. Mechanical working or re-heating steps realign the grains of the core, allow slipping within the metal, and thus decrease the original core hardness obtained by heat-treating. Working after heat treatment can be advantageous, e.g., when it is done to selectively lower the hardness of a nose portion of a bullet that is already jacketed. When a core must be reworked or reheated as a whole after precipitation heat treatment, however, some of the desired increase in hardness of the core is lost, even in portions of the core where high hardness is advantageous (e.g., the base).

Another problem that has been encountered in maximizing the penetrating capability of bullets has been the brittle nature of most jackets. During the process of applying the jacket to the bullet and resizing or reshaping the bullet, the jacket becomes brittle as the orientation, shape, and/or size of the grains are altered. Because the jacket is brittle, it tends to crack and fractures quickly upon impact, which decreases its penetrating capability.

The decrease in a bullet's penetration capability due to lead cores that are not sufficiently hard and jackets that are too brittle may be offset to some extent by increasing the jacket thickness. A thick jacket is less prone to fracture easily upon impact and is more likely to offset the problems of a core that is too soft. However, jacket materials, such as copper and copper alloys, typically are much more expensive than the core materials, such as lead and lead alloys. Both manufacturing time and expense are increased if a thicker jacket must be applied to the core.

An even more significant problem associated with known lead-core jacketed bullets is the final bullet rigidity which is a product of both the core rigidity and the jacket rigidity. A convenient rule of thumb is that every 0.001 inch in thickness of the copper jacket added to a core increases the effective bullet hardness by about 1 Brinell Hardness Number. Bullets produced by known methods have included copper or copper-alloy jackets as thick as 0.030 inch, although a typical jacket thickness is less than 0.008 inch. The Brinell hardness of lead cores produced by conventional bullet processing methods typically is about 8–9 Brinell. As a result, the rigidity index (core hardness plus jacket thickness×1,000 inches) of prior bullets typically are significantly less than 20, and more likely are from about 15 to about 17. Methods for increasing bullet rigidity while decreasing jacket thickness and production costs are therefore still needed.

SUMMARY

The new methods of this application, as well as articles produced by these methods, both of which are described in detail below, address the problems discussed in the Background. One described method for manufacturing parts in general comprises: (a) forming a first member comprising a first material, such as a nonferrous metal or metal alloy; (b) applying a second material, such as copper or a copper alloy, to an exterior surface of the first member, thereby forming a part; and (c) heating the part at a pre-selected temperature for a period of time sufficient to simultaneously harden the first member, such as through precipitation-hardening, and stress-relieve, and perhaps also anneal, the second material. The process includes quenching the part, such as by immersing it in water or other suitable fluid, after heating the part. The process also can include aging the part after quenching, where aging is continued for a period sufficient to further harden the part.

An example of a part that can be made by the described method is a bullet, or other projectile. A specific implementation comprised a bullet core made from a first material, and a jacket made from a second material that was applied to at least a portion of an external surface of the core. An example of a working embodiment of the first material was made from a lead alloy comprising, by weight: (a) from about 0.5 to about 7.4 percent antimony, generally from about 1 percent antimony to about 6 percent antimony, more typically from about 2 percent to about 4 percent antimony, with working embodiments having about 3 percent antimony; (b) from about 0 percent tin to an amount of tin substantially equal to that of antimony; (c) from about 0 percent to about 0.5 percent arsenic, more typically from about 0.02 percent to about 0.3 percent arsenic, with working embodiments having about 0.10 percent arsenic; and (d) the remainder being lead and trace impurities.

In working embodiments, the second material has been selected from the group consisting of copper, copper alloys, and mixtures thereof. The second material can be applied to the core by a number of methods. A currently preferred method for forming the jacket about at least a portion of the core is electroplating. Another method for applying the jacket to at least a portion of the core includes, without limitation, mechanically applying a jacket formed by conventional cup and drawing processes.

Bullet embodiments having lead-alloy cores and copper or copper-alloy jackets have been heat treated at a temperature within the range of from about 400° F. to about 500° F., generally from about 450° F. to about 480° F. In preferred embodiments the part was maintained at a substantially constant temperature within this temperature range for a period of time sufficient to solution treat (harden, generally precipitation-harden) the first material and stress-relieve, and perhaps anneal, the second material. This period of time can vary, but generally has been found to be at least 5 minutes, more typically about 15 minutes, and perhaps even as long as 30 minutes. The duration of the heating period can vary, and depends upon a number of factors including the particular alloy used, the hardness desired in the part and economic reasons for minimizing the heating time.

One example of a jacketed projectile made by the described method had the precipitation-hardened lead-alloy core described above and a copper or copper alloy electroplated to at least a portion of an external surface of the core to form a jacket having a thickness of about 0.004 inch. Cores produced using this alloy and processed by the described method had Brinell Hardness Numbers of from about 10 $kg/mm^2$ to about 40 $kg/mm^2$ and core yield strengths of from about 5,150 to about 20,600 psi. These values are appreciably higher than those for cores produced by known methods, having reported BHN values of 8–9 $kg/mm^2$ and core strengths of 4,120 to 4,635 psi.

The described method can be used to produce several different bullet types having various Brinell Hardness Numbers for various applications. Solely by way of example and not limitation, the described methods can be used to make jacketed, or at least partially jacketed bullets, such as ATK's TMJ® bullets, and soft nose or hollow point bullets, such as ATK's GOLD DOT® hollow point bullets.

DETAILED DESCRIPTION

I. Cartridge Structure

Figure 1:
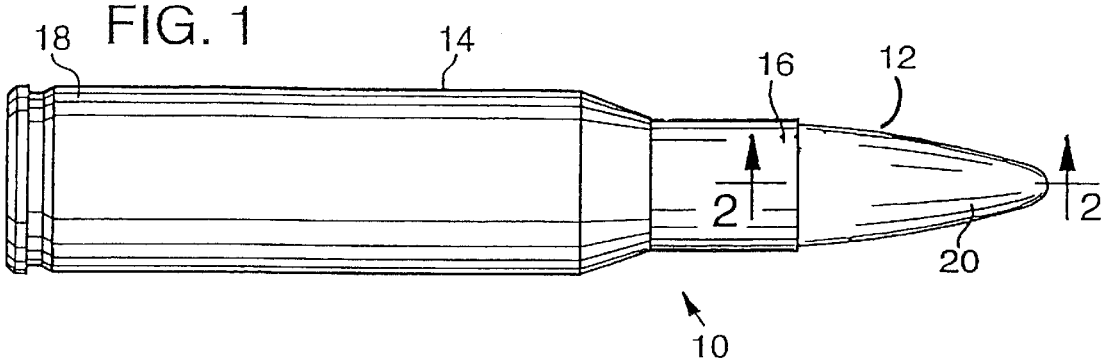
FIG. 1 is a schematic drawing of a cartridge incorporating a jacketed bullet made according to an implementation of the described method.

Referring to FIG. 1, cartridge 10 includes a bullet 12 (e.g., FIG. 2) and a casing 14. Elongated casing 14 has an open end 16 and a closed end 18. The open end 16 is shaped to receive the bullet 12. A visible ogive portion of the bullet 12 ("ogive" refers to the tapered or curved forward nose profile of the bullet) extends outwardly from the casing 14. Bullets can have various compositions and can be jacketed with various materials.

Figure 2:
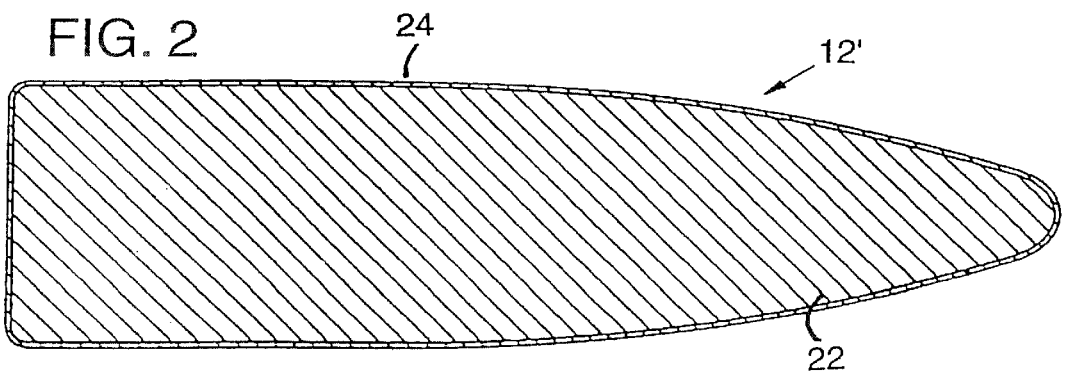
FIG. 2 is a schematic drawing of a jacketed bullet made according to an implementation of the described method.

FIG. 2 shows an embodiment of a bullet 12 that can be manufactured in accordance with the described method. The bullet 12 includes a core 22, preferably made from a lead alloy, and a jacket 24, preferably made from copper or a copper alloy. The jacket 24 may partially cover, may substantially cover, or may completely surround and cover the core 22.

II. Bullet Core Material and Forming the Core

As stated above, the described method can be practiced with a wide variety of metals and alloys that are useful for forming the core and any jacket used to cover at least a portion of the core. Solely by way of example, working embodiments of bullets made according to the described method have included lead cores or lead-alloy cores. Lead and lead-alloy cores are known in the art, such as disclosed by U.S. Pat. Nos. 4,750,427, 4,793,037, 4,879,953, 5,187, 325, 5,621,186 and 5,641,937. Lead and lead-alloy cores also are described in Dennis Marshall's *Stronger Bullets with Less Alloying, Cast Bullets,* No. 211, pages 118–129, which is incorporated herein by reference.

One example of a lead-alloy used to form cores comprised, by weight: (a) from about 1 percent to about 7.4 percent antimony, more typically from about 2 percent to about 3 percent antimony, with working embodiments having about 2.7 percent antimony; (b) from 0 percent to about 7.4 percent tin, and more typically an amount of tin not to exceed that of antimony; (c) from about 0 percent to about 0.5 percent arsenic, more typically for about 0.02 percent to about 0.5 percent arsenic with working embodiments having about 0.10 percent arsenic; and (d) the remainder being lead and impurities.

Zinc and zinc-alloys also can be used for forming the core. The core may be formed by any suitable method including, but not limited to, casting, turning larger stock on a lathe, cold headed, swaged, wrought, rolled, etc. Working embodiments of bullets made by the described method had swage formed cores. The effectiveness of the heat-treating process described infra has not been affected by the way the core was formed.

III. Jacket Material and Applying the Jacket

A jacket is applied to the core to form a bullet. Lead-alloy cores having copper jackets have been made by the described method. Copper-alloys, such as brass, also can be used to form jackets.

Any method for forming a jacket on or applying a jacket to a core is suitable. All such methods are referred to herein as applying jackets to cores. A currently preferred method for applying the jacket to the core is to electroplate the jacket material to the core. Electroplating is preferred because it is a fast and precise method, and provides a chemical bond between the jacket and the core. This helps secure the two parts together and increase the bullet's resistance to deformation. Alternative methods for applying the jacket to the core include mechanical assembly of separately produced jackets and cores.

IV. Heat-Treating Jacketed Cores

In known methods, the core is heat treated prior to applying the jacket to the core. The optimal core hardness of the final bullets obtained by these known hardening methods is significantly less than that obtained by the described method. This is because of the subsequent mechanical work typically done to bullets during mating of the core and jacket together and further after the bullet is subjected to the final forming process to obtain the desired shape and size. Further, with conventional processes the jacket is stressed and work-hardened so much that it becomes more brittle than desirable.

One embodiment addresses the shortcomings of conventional bullet heat-treating processes. According to this embodiment, the jacket is first formed about at least a portion of the core before any heat-treating has occurred. Thereafter, the entire bullet is heat treated such that the core is hardened and the jacket is softened simultaneously.

A. Processing Temperatures

The bullet preferably is heated to a temperature sufficient to heat treat (e.g. stress-relieve and/or anneal) the jacket and to harden the core. In a working embodiment where the core was made from the lead alloy described above and copper-jacketed, the bullet preferably was heated to a temperature between about 400° F. and 500° F., typically from about 428° F. to about 485° F., and more typically from about 450° F. to about 480° F. Working embodiments of such bullets were made at 465° F. and 475° F. It currently appears that the best results, in terms of bullet hardness, are obtained using a heat-treating temperature of about 475° F. But, the preferred heating temperature for a particular group of metals and/or alloys will depend on the materials used.

B. Processing Times

The bullets made by the described method preferably are held at a temperature within the range described above ("soaked") for a period sufficient to obtain the desired results. The time should be sufficient to assure a uniform temperature throughout the bullet, and to allow the materials to reach their equilibrium phase at that temperature.

In working embodiments, the bullet was held at a temperature within the range of from about 400° F. to about 500° F. for at least 4 minutes and up to at least as long as 30 minutes, more typically from about 10 minutes to about 20 minutes, with working embodiments generally having been made using heating times of about 15 to about 16 minutes. From a materials science standpoint, soaking periods of longer than 30 minutes are neither advantageous nor disadvantageous. For economic reasons, the duration of the heating step generally should be as short as possible as long as such treating time provides the desired core and jacket heat-treating results.

In a commercial embodiment, bullets will be conveyed through a heat zone to effect the heat treatment described above. The heat zone will be heated to a temperature within the range stated above for lead or lead-alloy cores jacketed, at least partially, with copper or copper alloys. The heating time will be adjusted by either (1) adjusting the speed of the conveyor, (2) increasing or decreasing the length of the heat zone, or (3) both. A working embodiment of a commercial process has used a heat zone having a length of about 16 feet, and a conveyor speed of about 1 foot/minute, so that the total heating time was about 15–16 minutes.

V. Quenching

After the heating step, the bullet is quenched in a suitable fluid. "Quenching" refers to immersing, or at least partially immersing, the heated bullet in a fluid to quickly reduce its temperature.

In working embodiments, the entire bullet was quenched in water. Other quenching fluids, such as a brine solution or oil, also may be used.

A. Temperature of Quenching Fluid

The temperature of the quenching fluid has been found to affect certain physical properties of bullets made according to the described method. Data concerning the effects of quench temperature on final bullet hardness are provided below in Example 1. In general, final bullet hardness has been found to be inversely related to the quench temperature, i.e., plated bullet hardness appears to decrease with increasing quench temperature.

Final desired bullet hardness differs from one application to another. Hence, the quench temperature used can vary, depending on the desired bullet hardness. It has been found that jacketed bullets can be made according to the described method using fluids having quench temperatures ranging from about 30° F. to about 120° F., more typically from about 50° F. to about 80° F., with best results currently being obtained using fluids having quench temperatures ranging from about 50° F. to about 60° F.

B. Soak Times

Soak times at a constant temperature also have been found to affect certain physical properties of bullets made according to the described method. Data concerning the effects of soak time on final bullet hardness at a constant quench temperature is provided below in Example 2. In general, final bullet hardness at a constant soak temperature is reached within about 10 minutes. Soak times of as long as 25 minutes have not been found to deleteriously reduce final core hardness.

VI. Aging

Jacketed bullets made by the described method typically are aged following the quenching step to achieve their maximum hardness. The hardness of the core increases as the bullet is aged. The bullet therefore should be aged long enough to allow the core to reach its final hardness. In a working embodiment, the core was aged for 24 hours. Moreover, in a working embodiment, the core was aged at ambient temperature. However, for some alloys or materials it may be preferable to age the bullet at a temperature other than ambient, particularly at a temperature above ambient.

Example 3 provides data concerning the effects of aging on final core hardness for 9-mm, 115-grain jacketed bullets. These data show that after only about 25–30 minutes, and perhaps after only 15 minutes, jacketed bullets made according to the described method had substantially reached their final hardness. Table 1 below also shows the effects of aging bullets having different alloy compositions at different temperatures. This table shows that bullets made according to the described method maintain their hardness over a 32-week period.

TABLE 1

PRECIPITATION-HARDENED[1]
LEAD ALLOY BULLET CORES
(.40-180-TMJ)

| CONDITION | TEMPERATURE | BRINELL HARDNESS[2] (n = 5) | | |
| --- | --- | --- | --- | --- |
| | | .85% Sb[3] | 3% Sb[4] | 5% Sb[5] |
| Untreated | +75° | 8.1 | 10.3 | 10.1 |
| Heat Treated, aged 1 wk | 0° F. | 7.5 | 29.2 | 20.1 |
| Heat Treated, aged 2 wk | 0° F. | 7.7 | 30.0 | 21.0 |
| Heat Treated, aged 3 wk | 0° F. | 7.5 | 28.4 | 20.8 |
| Heat Treated, aged 4 wk | 0° F. | 8.1 | 28.4 | 21.0 |
| Heat Treated, aged 8 wk | 0° F. | 8.1 | 28.1 | 20.4 |
| Heat Treated, aged 11 wk | 0° F. | 10.0 | 29.2 | 20.5 |
| Heat Treated, aged 32 wk | 0° F. | 11.4 | 27.3 | 21.5 |
| Heat Treated, aged 1 wk | +40° F. | 10.5 | 28.6 | 22.1 |
| Heat Treated, aged 2 wk | +40° F. | 11.9 | 29.2 | 20.9 |
| Heat Treated, aged 3 wk | +40° F. | 11.9 | 26.8 | 20.2 |
| Heat Treated, aged 4 wk | +40° F. | 12.9 | 27.9 | 20.8 |
| Heat Treated, aged 8 wk | +40° F. | 13.7 | 27.6 | 20.4 |
| Heat Treated, aged 11 wk | +40° F. | 15.1 | 28.3 | 21.9 |
| Heat Treated, aged 32 wk | +40° F. | 15.7 | 24.1 | 20.2 |
| Heat Treated, aged 24 hrs | +75° F. | 7.4 | 31.1 | 21.6 |
| Heat Treated, aged 1 wk | +75° F. | 11.8 | 28.7 | 22.1 |
| Heat Treated, aged 2 wk | +75° F. | 13.8 | 28.6 | 21.2 |
| Heat Treated, aged 3 wk | +75° F. | 13.9 | 28.3 | 20.3 |
| Heat Treated, aged 4 wk | +75° F. | 14.6 | 27.7 | 20.6 |
| Heat Treated, aged 8 wk | +75° F. | 15.0 | 27.6 | 20.0 |
| Heat Treated, aged 11 wk | +75° F. | 15.3 | 28.3 | 20.5 |
| Heat Treated, aged 32 wk | +75° F. | 14.5 | 27.6 | 20.0 |
| Heat Treated, aged 1 wk | +125° F. | 12.4 | 24.7 | 19.2 |
| Heat Treated, aged 2 wk | +125° F. | 12.5 | 24.2 | 19.1 |
| Heat Treated, aged 3 wk | +125° F. | 11.5 | 22.5 | 18.7 |
| Heat Treated, aged 4 wk | +125° F. | 12.0 | 21.9 | 17.6 |
| Heat Treated, aged 8 wk | +125° F. | 11.4 | 19.6 | — |
| Heat Treated, aged 11 wk | +125° F. | 12.3 | 19.6 | 17.1 |
| Heat Treated, aged 32 wk | +125° F. | 11.7 | 16.9 | 15.3 |

[1]Solution treated at 465° F. for 1 hour, cool water quenched.
[2]Yield Strength (psi) is approximately 515 times the Brinell Hardness Number.
[3]Sb 0.899%   As = <0.0001%
[4]Sb 2.79%   As = 0.080%
[5]Sb = 4.92% As = 0.037%

VII. Additional Processing

Bullets made according to the described method also can be subjected to other conventional processing steps to improve physical characteristics and/or to improve aesthetic qualities. For example, during the heat-treating process described above the external surface of the jacket may become discolored from oxidation. The bullet can be acid washed to remove this oxidation. Decorative platings of materials, such as nickel or chromium, also may be added without detracting from the advantages provided by the described method.

VIII. Rigidity Index

Bullets made according to the described method have cores that are hardened and jackets that have been stress-relieved and are more ductile than known bullets. The hardened core increases the deformation resistance of the entire bullet, which provides bullets having greater penetration capability. The softened jacket is less brittle so it is less likely to crack or shatter on impact. This increases the bullet's penetrating capability. The hardened core allows a thinner jacket to be used, which increases the manufacturing speed and substantially decreases the cost.

Moreover, bullets made according to the described method have significantly higher rigidity indexes than prior bullets. As used herein, "rigidity index" refers to the sum of the core's Brinell Hardness Number (generally reported in $Kg/mm^2$) and the thickness of the jacket in inches times 1,000. For example, conventional jacketed 9-mm, 115-grain bullets such as ATK's TMJ® bullets, have a lead core Brinell Hardness Number of about 9 and a copper jacket thickness of about 0.008 inch. The rigidity index for an ATK TMJ® bullet is about 17[9+(0.008×1,000)≈17]. In general, jacketed bullets made by known methods have rigidity indexes of less than about 20.

In contrast, electroplated bullets made according to the described method have much higher rigidity indexes. For example, such bullets made according to the described method have rigidity greater than 20, typically greater than about 25, and perhaps greater than 30.

The 9-mm, 115-grain jacketed bullets made as described below in Example 1 had a jacket thickness of about 0.004 inch, and core Brinell Hardness Numbers ranging from about 25 to about 30. As a result, these 9-mm, 115-grain bullets had rigidity indexes ranging from about 29[25+(0.004×1,000)] to about 34[30+(0.004×1,000)].

As a further example, 0.40-caliber, 180-grain bullets made as described below in Example 2 had a jacket thickness of about 0.006 inch, and core Brinell Hardness Numbers again ranging from about 25 to about 30. As a result, these 0.40-caliber, 180-grain bullets had rigidity indexes ranging from about 31[25+(0.006×1,000)] to about 36[30+(0.006×1,000)].

IX. Differential Hardening

For some applications, it is desirable to produce a jacketed bullet that varies in hardness and strength in a predetermined manner at different points along the bullet's dimensions. For example, it is desirable to produce a jacketed core having a higher hardness at its rear end or base and a lower hardness at its forward end or nose, i.e., a gradient of hardness in the direction of the bullet's longitudinal axis.

The high hardness of the base helps resist the forces of the propellant combustion gases, which may exceed 50,000 psi, as well as rotational stresses imparted by the rifling grooves of a gun barrel. The lower hardness of the nose helps ensure that is well deform sufficiently upon impact and transfer more energy before exiting the target. One example of a bullet exhibiting differential hardening is described below in Example 4.

Initially, a jacketed core is subjected to heat treatment as described above, which results in a substantially uniform hardness throughout the lead alloy core, as well as a substantially uniform hardness throughout the jacket. Thereafter, a portion of the heat-treated, jacketed core (usually the nose) is then reworked, but the remainder of the core (usually the base) is not reworked. (Of course, it would be possible to rework the entire core, with some portions being reworked more than other portions, to achieve a similar differential hardness effect.)

According to a first approach, the reworking is a mechanical reforming operation. The reworked portion of the bullet tends to decrease in hardness and strength. In Example 4, the nose of the bullet is reworked into a hollow point configuration. The reworking lowers the hardness of the hollow point nose without affecting the higher hardness of the remaining portion extending rearward toward the base of the bullet. It is also possible to mechanically reform the nose portion of a bullet into other than a hollow point configuration and achieve the same hardness decreasing effect in the reformed portion.

Figure 7:
FIG. 7 is a schematic process flow diagram showing steps of another method in which the core is selectively reformed following precipitation heat treatment.

A specific implementation is described in connection with FIG. 7. The lead alloy core is formed (step a) and coated with a suitable jacket material (e.g., copper) to form a jacketed core (step b). In step c, the jacketed core is subjected to precipitation heat treatment according to the described method. The resulting jacketed bullet core, has a substantially uniform hardness and strength.

In step d, the nose section of the jacketed core is reworked in a mechanical reshaping operation. Specifically, referring to the schematic cross-section of the part in step d, some material from the nose end is removed, and opposite sections of the remaining outer periphery of the nose end are compressed toward each other to form the finished bullet having a tapered nose end, as shown in step e.

According to a second approach, the heat-treated jacketed core is reworked by selective annealing. Selective annealing, or the selective application of heat, can be carried out using a flame, electrical inductance element or other equivalent structure. The desired amount of annealing can be controlled by adjusting the temperature and/or duration of the applied heat. In general, the temperature should be greater than 215 degrees F.

Figure 8:
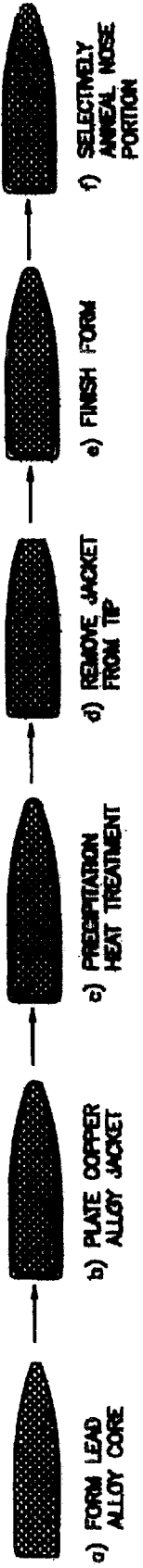
FIG. 8 is a schematic process flow diagram showing steps of another method in which the core is selectively annealed following precipitation heat treatment.

A specific implementation is described in connection with FIG. 8. Steps a, b and c are the same as described above for FIG. 7, except the shape of the jacketed lead alloy core in FIG. 8 has a tapered nose portion more closely resembling the shape of a finished bullet. In step d, a tip of the nose is removed to expose the lead alloy core. The exposed core, which is now unconfined by the jacket in the forward direction, is extruded forward in the final nose forming operation (step e). In step f, the bullet is selectively annealed to produce differential hardness in the longitudinal direction (i.e., with the nose having a lower hardness than the base).

As a result of either approach, a deliberately weakened part of the bullet contacts the target first, thereby facilitating the expansion process while the bullet still retains sufficient energy and velocity to expand fully.

EXAMPLES

The following examples are provided to exemplify certain features. These examples are illustrative, and the claims should not be limited to the features described in the examples.

Example 1

This example describes a process for making jacketed bullets according to the described heat-treating method and provides data concerning the effects of quench temperature on bullet hardness for bullets made by the process.

A lead-alloy core material was selected comprising about 2.7 percent antimony, about 0.1 percent arsenic, a trace amount of tin, with the balance being lead and trace elements. A lead-alloy ingot of the material was obtained. 9-mm, 115-grain lead-alloy cores were swage-formed from stock material extruded in wire form from the ingot. Without first heat-treating the core, a 0.004-inch copper jacket was electroplated about the core.

The electroplated bullets were then fed from a hopper onto a conveyor that conveyed the bullets through a heat zone heated to a constant temperature of 465° F. The speed of the belt was about 1 foot/minute, and the length of the heat zone was about sixteen feet so that the total time the bullets were heated to 465° F. was about 16 minutes. The belt speed and/or the length of the heating zone are adjustable to vary the heating time.

Figure 4:
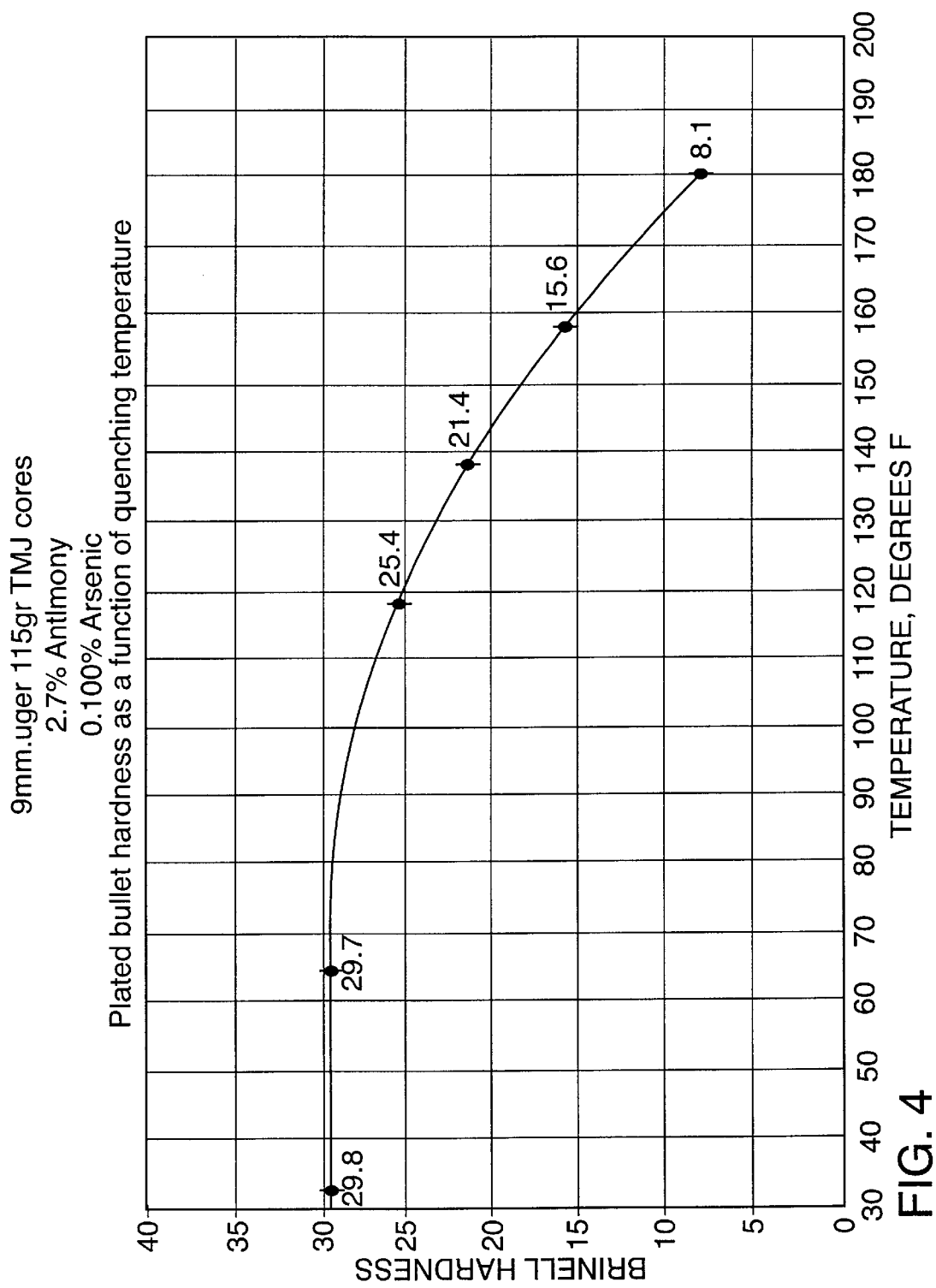
FIG. 4 is a graph illustrating plated bullet Brinell hardness as a function of the temperature (degrees Fahrenheit) of the material used to quench plated bullets made according to an implementation of the described method.

After the heat zone, the bullets were deposited from the conveyor belt into water (used as a quench fluid), which was maintained at a substantially constant temperature. Bullets made by the method of this example were quenched at different temperatures. The results of this study are presented in FIG. 4, which shows that plated bullet hardness decreases as quench temperature increases. Moreover, for plated bullet Brinell Hardness Numbers of from about 30 Kg/mm$^2$ and decreasing to about 25 Kg/mm$^2$, quench temperatures were within the range of from about 30° F. to about 120° F. With quench temperatures ranging from about 70° F. to about 1 00° F. the plated bullet Brinell hardness was within the range of from about 30 Kg/mm$^2$ to about 27 Kg/mm$^2$.

Example 2

This example describes a process for making jacketed bullets according to the described heat-treating method and provides data concerning the effects of soak time (i.e., the time the bullets are heated at the heat-processing temperature) at constant temperature on bullet hardness of jacketed bullets made by the process. A lead-alloy core material was selected comprising 2.7 percent antimony, about 0.1% percent arsenic, a trace amount of tin, with the balance being lead and other trace elements. 0.40-caliber, 180-grain bullet cores. were swage-formed from this lead alloy. Without first heat-treating the core, a copper jacket was electroplated to the core. The jacket had a final thickness of about 0.006 inch.

The electroplated bullets were then fed from a hopper onto a traveling belt that conveyed the bullets through a heat zone heated to a constant temperature of 475° F. The speed of the belt and the length of the heat zone the bullets were such that the total time the bullets were heated ("soaked") to 475° F. was approximately 15 minutes.

Figure 3:
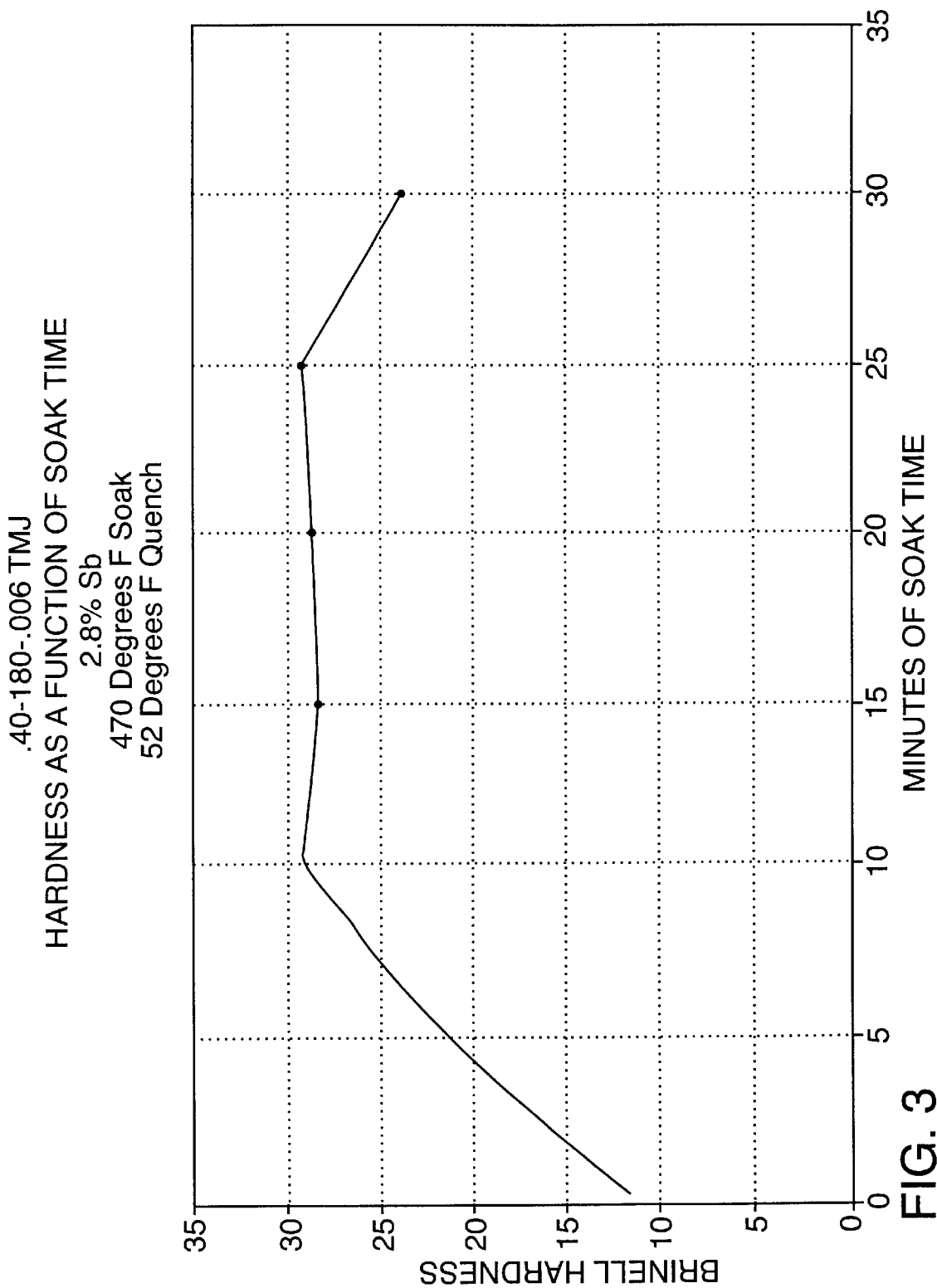
FIG. 3 is a graph illustrating plated bullet Brinell hardness as a function of soak time (minutes) for bullets made according to an implementation of the described method.

After the heat zone, the bullets were deposited from the conveyor belt into a quench fluid maintained at a substantially constant temperature of 52° F. Bullets were made, heat-treated, and then quenched at 52° F. at different soak time periods to examine the effects of soak time on plated bullet Brinell hardness. The results of this study are presented in FIG. 3. FIG. 3 shows that tested bullets had a Brinell Hardness Number of about 30 Kg/mm$^2$ with as little as 10 minutes soak time, and that a soak time of as long as 25 minutes did not decrease the Brinell hardness.

Example 3

This example describes a process for making jacketed bullets according to the described heat-treating method and provides data concerning the effects of aging time (in hours) on bullet hardness for bullets made by the process. A lead-alloy core material was selected comprising 2.7 percent antimony, about 0.1 percent arsenic, a trace amount of tin, the balance being lead and other trace elements. A lead-alloy ingot of the material was obtained. 9-mm, 115-grain, lead-alloy cores were swage-formed from stock material extruded in wire form from the ingot. Without first heat-treating the core, a 0.004 inch, copper jacket was electroplated about the core.

The electroplated bullets were then fed from a hopper onto a conveyor that conveyed the bullets through a heat zone heated to a constant temperature of 475° F. The speed of the belt was about one foot/minute, and the length of the heat zone was about sixteen feet so that the total time the bullets were heated to 475° F. was about 16 minutes.

Figure 5:
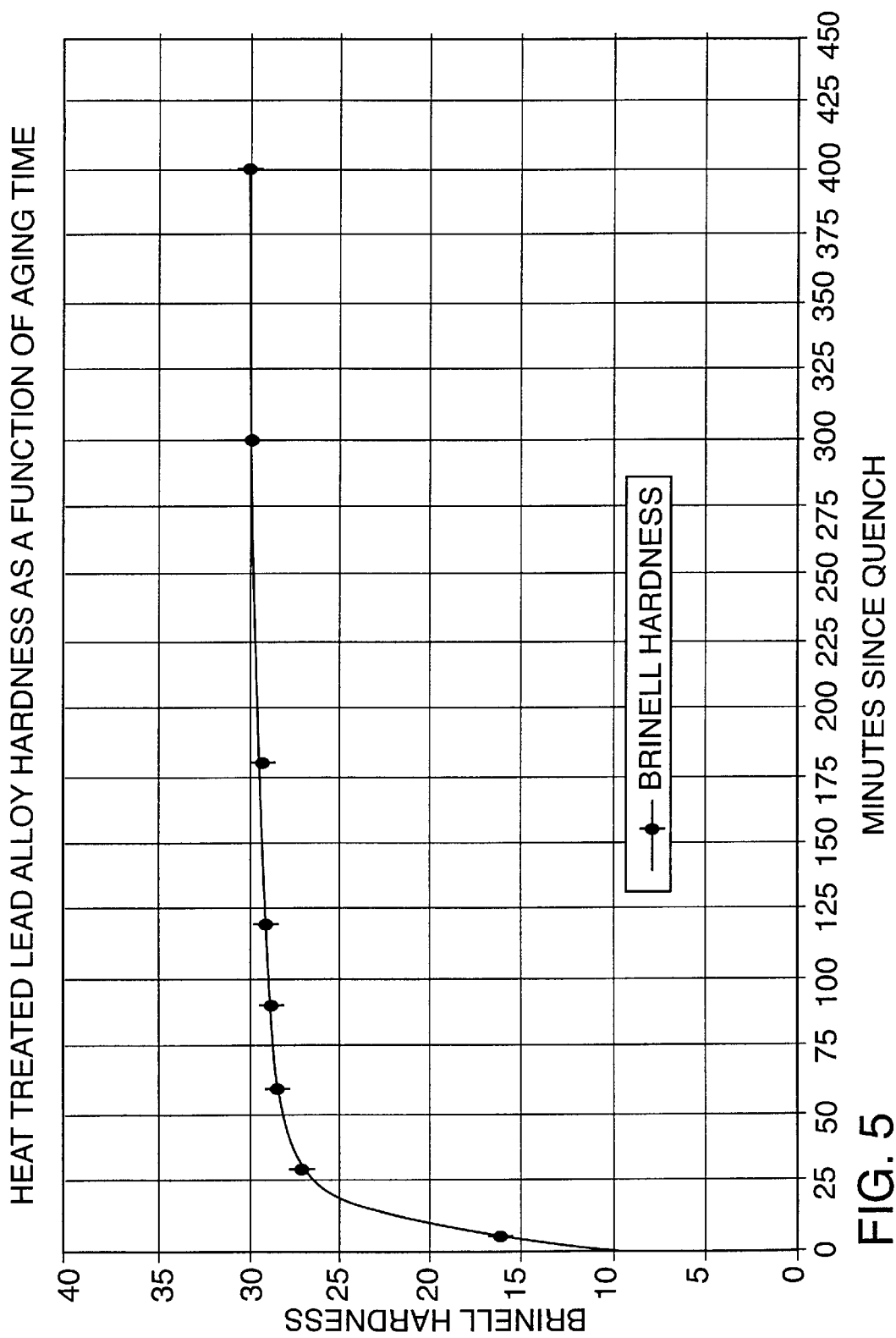
FIG. 5 is a graph illustrating plated bullet Brinell hardness as a function of aging time (minutes) for bullets made according to implementation of the described method.

After the heat zone, the bullets were deposited from the conveyor belt into quench water maintained at a substantially constant temperature of 52° F. Bullets were removed from the quench water and allowed to age harden at ambient room temperature for the times stated in Table 2. The results of this study are presented below in Table 2, and are presented graphically in FIG. 5.

TABLE 2

| Not Heat Treated | Brinell Hardness | | | | | | | |
|---|---|---|---|---|---|---|---|---|
| | 5 mins | 30 mins | 60 mins | 90 mins | 120 mins | 180 mins | 300 mins | 420 mins |
| 10.7 | 19.2 | 27.1 | 29.2 | 30.0 | 29.2 | 29.2 | 29.2 | 30.0 |
| 10.7 | 14.6 | 26.4 | 28.4 | 28.7 | 29.2 | 28.4 | 30.0 | 30.0 |
| 10.9 | 15.1 | 27.1 | 27.7 | 27.7 | 29.2 | 29.2 | 29.2 | 30.1 |
| 10.9 | 16.3 | 27.1 | 28.4 | 29.2 | 29.2 | 29.2 | 30.8 | 30.0 |
| 10.5 | 15.4 | 27.7 | 27.7 | 28.4 | 28.4 | 30.0 | 30.0 | 30.8 |
| Average = | | | | | | | | |
| 10.7 | 16.1 | 27.1 | 28.3 | 28.7 | 29.0 | 29.2 | 29.8 | 30.2 |

Example 4

The preceding examples described methods for making entirely jacketed bullets, such as ATK's TMJ® bullets. This example describes a method for making hollow-point bullets without sacrificing the hardness of the bullet core base portion when forming the hollow-point tip portion on the front of the bullet. Thus, bullets of this example have a differential hardness, in this case a gradient of hardness extending along the longitudinal axis of the bullet from its base to its tip or nose.

Jacketed bullets were made substantially as described above. Thereafter, just that portion that was to be the hollow-point tip was worked to form such tip. This resulted in a bullet in which the core and the jacket were heat-treated simultaneously to obtain a core Brinell Hardness Number of about 30 Kg/mm$^2$. The hollow-point tip thereafter was formed without working the remaining portion of the core to maintain the benefits associated with the present heat-treating process. The hardness of the base remained at least 20% greater than the hardness of the tip or nose portion.

Additional details concerning processes for making hollow-point bullets are provided by Moore et al., U.S. Pat. No. 5,079,814, which is incorporated herein by reference.

Example 5

This example describes a process for making jacketed bullets according to the described heat-treating method and provides data concerning the effects of soak time (in minutes) on bullet hardness for bullets made by the process. A lead-alloy core material was selected comprising 2.7 percent antimony, about 0.1 percent arsenic, a trace amount of tin, the balance being lead and other trace elements. A lead-alloy ingot of the material was obtained. 9-mm, 115-grain, lead-alloy cores were swage-formed from stock material extruded in wire form from the ingot. Without first heat-treating the core, a 0.004-inch copper jacket was electroplated about the core.

Approximately 20 electroplated bullets were conveyed through a heat zone having a length of about 16 feet and heated to a constant temperature of 475° F. The speed of the conveyor belt was varied from about 12 inches/minute to about 21 inches/minute. As a result, the soak time at 475° F. varied from about 8.1 minutes to about 14.2 minutes.

Another batch of 20 bullets was made, and these bullets were conveyed through a heat zone having a length of about 16 feet and heated to a constant temperature of 450° F. The speed of the conveyor belt was varied from about 12 inches/minute to about 21 inches/minute so that the soak time at 450° F. varied from about 8.1 minutes to about 14.2 minutes.

Bullets heat-treated at these two temperatures were then quenched in water having a temperature of about 51° F. Bullets were removed from the quench water and allowed to age-harden at ambient room temperature.

The results of this study are presented below in Table 3, which shows that the final Brinell hardness was reached after a soak time of only about 8 minutes. Increasing the soak time did not increase, and could in fact decrease, the core's Brinell hardness.

TABLE 3

| Temperature | Belt Speed | Soak Time | Hardness |
|---|---|---|---|
| 475° F. | 12"/min | 14.2 minutes | 33.4 Brinell |
| 475° F. | 15"/min | 11.4 minutes | 34.0 |
| 475° F. | 18"/min | 9.5 minutes | 34.3 |
| 475° F. | 21"/min | 8.1 minutes | 34.0 |
| 450° F. | 12"/min | 14.2 minutes | 29.7 |
| 450° F. | 15"/min | 11.4 minutes | 30.8 |
| 450° F. | 18"/min | 9.5 minutes | 32.2 |
| 450° F. | 21"/min | 8.1 minutes | 30.5 |

Example 6

This example describes a process for making jacketed bullets according to the described heat-treating method and provides data concerning the effects of heat-treating temperature (in °F.) on bullet hardness for bullets made by the process. A lead-alloy core material was selected comprising 2.7 percent antimony, about 0.1 percent arsenic, a trace amount of tin, the balance being lead and other trace elements. A lead-alloy ingot of the material was obtained. 9-mm, 115-grain, lead-alloy cores were swage-formed from stock material extruded in wire form from the ingot. Without first heat-treating the core, a 0.004-inch copper jacket was electroplated about the core.

Approximately 20 electroplated bullets per trial were conveyed through a heat zone having a length of about 16 feet. The speed of the conveyor belt was about 12 inches/minute so that the total soak time at each temperature was about 14 minutes. The soak temperature for each trial was as indicated below in Table 4.

Bullets heat-treated at the stated temperatures were quenched in water having a temperature of about 51° F. Bullets were removed from the quench water and allowed to age harden at ambient room temperature.

Figure 6:
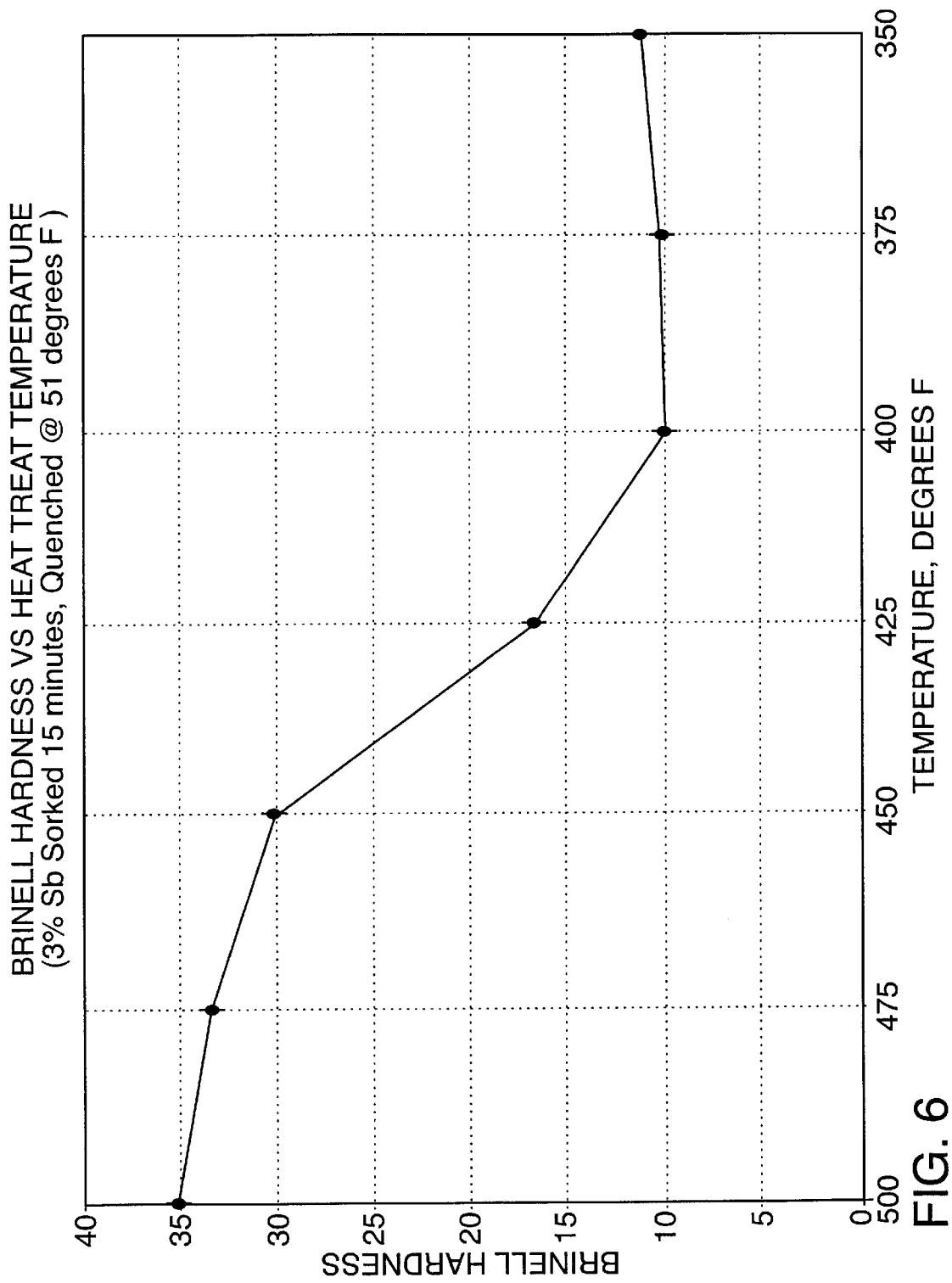
FIG. 6 is a graph illustrating bullet Brinell hardness as a function of soak temperature prior to quenching.

The results of this study are presented below in Table 4 and graphically in FIG. 6, which show that the maximum Brinell hardness of about 35.3 was reached at a soak temperature of about 500° F. Soak temperatures of less than about 400° F. provided cores having Brinell Hardness Numbers of less about 10–11. Soak temperatures of about 450° F. provided cores having Brinell Hardness Numbers of at least 30, and increasing the soak temperature up to at least 500° F. continued to increase core hardness. Soak temperatures above 486° F. should be avoided in commercial production when using the preferred alloys because melting or partial melting of alloy constituents occurs at temperatures above 486° F., the eutectic temperature (i.e., the lowest possible temperature of solidification for any mixture of specified constituents) of lead/antimony alloys.

TABLE 4

| Temperature | Belt Speed | Average Hardness |
|---|---|---|
| 500° F. | 12"/min | 35.3 Brinell |
| 475° F. | 12"/min | 33.7 |
| 450° F. | 12"/min | 30.3 |
| 425° F. | 12"/min | 16.7 |
| 400° F. | 12"/min | 10.1 |
| 375° F. | 12"/min | 10.3 |
| 350° F. | 12"/min | 11.2 |

From the embodiments described above, it should be apparent to a person of ordinary skill in the art that modifications will fall within the spirit and scope of the following claims. For example, the heat-treating process described could be used for a part comprising two dissimilar metals, wherein one is hardened and one is softened. Accordingly, the scope of the following claims should not be limited by the preceding disclosure.

I claim:

1. A method for making a jacketed bullet, comprising:

forming a core from a material selected from the group consisting of lead, lead alloys, and mixtures thereof;

applying a layer of copper or copper alloy to an external surface of the core to form a copper or copper alloy jacket, the jacket and core forming a bullet;

heating the bullet to stress-relieve the jacket and precipitation-harden the core;

quenching the bullet;

aging the bullet to allow the core to achieve its final hardness; and reworking a nose portion of the aged bullet, thereby decreasing the hardness of the nose portion while substantially maintaining the hardness of the remaining bullet.

2. The method of claim 1, wherein reworking the nose portion includes mechanically reforming the nose portion.

3. The method of claim 1, wherein reworking the nose portion includes selectively annealing the nose portion.

4. The method of claim 1, wherein reworking the nose portion includes removing a tip of the jacketed nose portion to expose the core and drawing the core forward for reshaping into a tapered nose.

5. The method of claim 1, wherein reworking the nose portion includes selectively annealing the nose portion using a flame.

6. The method of claim 1, wherein reworking the nose portion includes selectively annealing the nose portion by using an electrical inductive heating element.

7. The method of claim 1, wherein the jacket is electroplated to the external surface of the core.

8. The method of claim 1 where the jacket has a thickness of at least about 0.004 inch.

9. The method of claim 1 where the core is made from a lead alloy comprising:

from about 0.5 percent to about 7.4 percent antimony by weight;

from about 0 percent tin by weight to an amount of tin substantially equal to that of antimony; and from about 0 to about 0.5 percent arsenic by weight.

10. The method of claim 1 where the bullet is aged for a period of at least 3 hours.

11. A method for making a jacketed bullet, comprising:

forming a core from a material selected from the group consisting of lead, lead alloys, and mixtures thereof;

applying a layer of copper or copper alloy to an external surface of the core to form a copper or copper alloy jacket, the jacket and core forming a bullet;

heating the bullet to stress-relieve the jacket and precipitation-harden the core; and reworking a nose portion of the bullet, thereby decreasing the hardness of the nose portion while substantially maintaining the hardness of the remaining bullet.

12. The method of claim 11, wherein reworking the nose portion includes mechanically reforming the nose portion.

13. The method of claim 11, wherein reworking the nose portion includes removing a tip from the jacketed nose portion to expose the core and drawing the core forward for reshaping into a tapered nose.

14. The method of claim 11, wherein reworking the nose portion includes selectively annealing the nose portion.

15. The method of claim 11, wherein reworking the nose portion includes selectively annealing the nose portion using a flame.

16. The method of claim 11, wherein reworking the nose portion includes selectively annealing the nose portion using an electrical inductive heating element.

* * * * *

UNITED STATES PATENT AND TRADEMARK OFFICE
CERTIFICATE OF CORRECTION

PATENT NO. : 6,613,165 B1
DATED : September 2, 2003
INVENTOR(S) : Kenneth L. Alexander It is certified that error appears in the above-identified patent and that said Letters Patent is hereby corrected as shown below:

Column 8,
Line 47, delete "$^3$Sb 0.899%" and insert -- $^3$Sb = 0.899% --.
Line 48, delete "$^4$Sb 2.79%" and insert -- $^4$Sb = 2.79% --.

Column 9,
Line 48, delete "is well" and -- it will --.

Column 11,
Line 16, delete "about 1 00° F." and insert -- about 100° F. --
Line 30, delete "cores." and insert -- cores --.
Line 38, delete "the bullets".

Column 13,
Line 63, delete "less about" and insert -- less than about --.

Signed and Sealed this

Thirteenth Day of July, 2004

JON W. DUDAS
*Acting Director of the United States Patent and Trademark Office*